US 6,640,236 B1

(12) United States Patent
Lupin et al.

(10) Patent No.: US 6,640,236 B1
(45) Date of Patent: Oct. 28, 2003

(54) METHOD AND APPARATUS FOR GENERATING MULTIPLE BITS OF A PSEUDONOISE SEQUENCE WITH EACH CLOCK PULSE BY COMPUTING THE BITS IN PARALLEL

(75) Inventors: Edward O. Lupin, San Diego, CA (US); Nagabhushana T. Sindhushayana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/386,600

(22) Filed: Aug. 31, 1999

(51) Int. Cl.[7] .................................................. G06F 1/02
(52) U.S. Cl. ...................... 708/250; 708/252; 708/253
(58) Field of Search .................................. 708/250, 251, 708/252, 253, 254, 255, 256

(56) References Cited

U.S. PATENT DOCUMENTS

| | | |
|---|---|---|
| 3,881,099 A | 4/1975 | Ailett et al. |
| 4,901,307 A | 2/1990 | Gilhousen et al. ............ 370/18 |
| 5,046,036 A * | 9/1991 | Tezuka ........................ 708/253 |
| 5,101,501 A | 3/1992 | Gilhousen et al. ............ 455/33 |
| 5,103,459 A | 4/1992 | Gilhousen et al. ............. 375/1 |
| 5,109,390 A | 4/1992 | Gilhousen et al. ............. 375/1 |
| 5,228,054 A | 7/1993 | Rueth et al. |
| 5,506,865 A | 4/1996 | Weaver, Jr. ................. 375/205 |
| 5,644,591 A | 7/1997 | Sutton ........................ 375/200 |
| 5,805,648 A | 9/1998 | Sutton ........................ 375/367 |
| 5,910,907 A | 6/1999 | Chen et al. |
| 6,141,669 A * | 10/2000 | Carleton ..................... 708/252 |

OTHER PUBLICATIONS

O. Kaestner: "Implementing Branch Instructions With Polynomial Counters" Computer Design, vol. 14, No. 1, Jan. 1975. (pp. 69–75).

* cited by examiner

Primary Examiner—Chuong Dinh Ngo
(74) Attorney, Agent, or Firm—Philip Wadsworth; Kent Baker; Pavel Kalousek

(57) ABSTRACT

The invention presented is a novel method and apparatus for generating PN sequences with an arbitrary number of bits, where the number of bits is provided in parallel with each clock pulse. This allows the sequences to be generated at high speed when needed, and allows parallel processing in the acquisition and demodulation processes. In the invention, the initial values of states are loaded into registers of a parallel PN generator, which immediately generates the next n bits of the PN sequence, where n is an arbitrary number dependent on performance required. Then, a first sub-part of the PN generator of the present invention receives the present state of the PN generator and outputs the state of the PN generator n bits in the future. The output of this first sub-part is then provided to a second sub-part of the generator, which generates the next n bits of the PN sequence. In this fashion, the entire PN sequence can be continuously generated. The PN generator also contains a control processor, coordinating co-operation between subsystems.

41 Claims, 7 Drawing Sheets

METHOD AND APPARATUS FOR GENERATING MULTIPLE BITS OF A PSEUDONOISE SEQUENCE WITH EACH CLOCK PULSE BY COMPUTING THE BITS IN PARALLEL

BACKGROUND OF THE INVENTION

I. Field of the Invention

The invention presented relates to pseudonoise (PN) sequence generators. More particularly, the present invention relates to a method and an apparatus for generating PN sequence with each clock pulse by computing their bits in parallel.

II. Description of the Related Art

The Telecommunications Industry Association has standardized a method for code division multiple access (CDMA) communications in the IS-95 family of interim standards, entitled "Mobile Station-Base Station Compatibility Standard for Dual Mode Wideband Spread Spectrum Cellular System." In addition, the Telecommunications Industry Association in its submission to the International Telecommunications Union, entitled "The cdma2000 ITU-R RTT Candidate Submission," describes proposed CDMA system that would be able to support higher data rates and higher capacity. Both in the IS-95 standard and in the cdma2000 proposal, the transmitted waveform is modulated in accordance with a pseudonoise spreading sequence.

The use of a pseudonoise sequence with appropriate autocorrelation characteristics is essential to the operation of a CDMA system in which multipath components are present. The generation and employment of pseudonoise sequences are described in detail in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention, and incorporated by reference herein.

The aforementioned U.S. Pat. Nos. 4,901,307 and 5,103,459 describe the use of a pilot signal used for acquisition. The use of a pilot signal enables the remote user to acquire local base station communication system in a timely manner. The remote user gets synchronization information and relative signal power information from the received pilot signal. U.S. Pat. Nos. 5,644,591 and 5,805,648, both entitled "METHOD AND APPARATUS FOR PERFORMING SEARCH ACQUISITION IN A CDMA COMMUNICATION SYSTEM," describe a novel and improved method and apparatus that reduces the remote user forward link acquisition time. Both patents are assigned to the assignee of the present invention and are incorporated by reference herein.

Space or path diversity is obtained by providing multiple signal paths through simultaneous links from a remote user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, entitled "SOFT HAND-OFF IN A CDMA CELLULAR TELEPHONE SYSTEM," and U.S. Pat. No. 5,109,390, entitled "DIVERSITY RECEIVER IN A CDMA CELLULAR TELEPHONE SYSTEM," both assigned to the assignee of the present invention, and incorporated by reference herein.

In CDMA communications systems, a pilot signal is transmitted that allows a receiver to coherently demodulate the received signal. Within demodulator of such receivers is a channel estimate generator, which estimates the channel characteristics based on the pilot signal transmitted with values known to both the transmitter and the receiver. The pilot signal is demodulated and the phase ambiguities in the received signal are resolved by taking the dot product of the received signal and the pilot signal channel estimate. An exemplary embodiment of a circuit for performing the dot product operation is disclosed in U.S. Pat. No. 5,506,865, entitled "PILOT CARRIER DOT PRODUCT CIRCUIT," assigned to the assignee of the present invention, and incorporated by reference herein.

SUMMARY OF THE INVENTION

The invention presented is a novel method and apparatus for generating a PN sequences with an arbitrary number of bits, where the number of bits is provided in parallel with each clock pulse. This allows the sequences to be generated at high speed when needed, and allows parallel processing in the acquisition and demodulation processes. The invention describes in detail generation of PN sequences as standardized for the IS-95 communications systems. As proposed in the IS-95 standards, the pseudonoise spreading sequences are maximal length sequences that are capable of being generated using linear feedback shift-registers (LSFRs). Using a linear feedback shift-register, the PN sequences are computed one bit with each clock pulse.

In the invention, the initial PN states are loaded into registers of a parallel PN generator, which immediately generates the next n bits of the PN sequence, where n is an arbitrary number dependent on performance required. In addition, the present invention provides a method of determining the register states of the parallel PN generator an arbitrary number of cycles in the future. Thus, the present invention takes the present state of the registers of the PN generator and outputs the next n bits of the generator. In addition, the PN generator of the present invention receives the present state of the PN generator and outputs the state of the PN generator n bits in the future. In this fashion, the entire PN sequence can be continuously generated.

It will be understood by one skilled in the art that although the present invention is directed toward the generation of a psuedonoise sequences compliant with systems standardized by the Telecommunications Industry Association, the teachings of the present invention are equally applicable to the generation of other psuedonoise sequences such as, the orthogonal Gold code sequences proposed for use in the W-CDMA, proposals to the International Telecommunications Industry Association, proposals by the European Telecommunications Standards Institute (ETSI), and the Association of Radio Industries and Business (ARIB).

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1A:
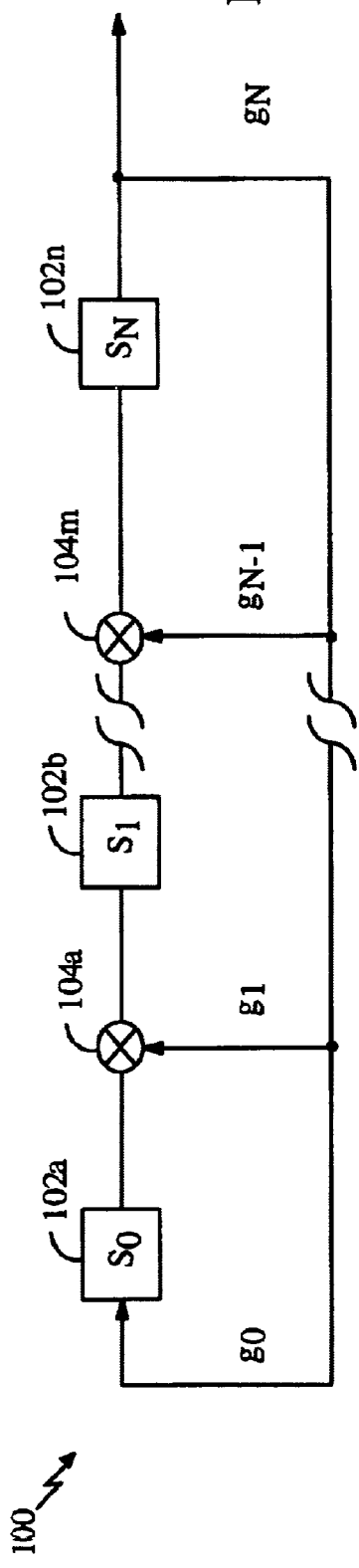
FIGS. 1a–1d illustrate prior art embodiments of pseudonoise (PN) generators employing linear feedback shift-registers.

FIG. 1a illustrates a traditional apparatus employing a linear feedback shift-register for generating pseudonoise sequences. The generalized shift-register 100 from FIG. 1a comprises memory elements 102a, 102b, ..., 102n, holding state values $S_0(n)$, $S_1(n)$, ..., $SN_N(n)$. The last value $S_N$ constitutes an output of the shift-register, and also a feedback to modulo-2 adders 104a, ..., 104m. Before the value $S_N$ is provided to a particular modulo-2 adder 104a, ..., 104m, it is multiplied by an associated coefficient $g_0, g_1, \ldots, g_N$. A coefficient will take a value of '1' if a feedback is desired, and a value of '0' otherwise.

Short-code pseudonoise sequences are used to modulate and demodulate the in-phase (I) and quadrature-phase (Q) components of the CDMA waveform. The I and Q short-code PN sequences are periodic with a period of $2^{15}-1$ with a bit stuffed at the preamble of sequence to make the sequence periodic with an even factor of 2.

The short-code $PN_I$ sequence satisfies a linear recursion specified by the following generator polynomial ($P_I$):

$$P_I(x) = x^{15} + x^{13} + x^9 + x^8 + x^7 + x^5 + 1. \tag{1}$$

Figure 1B:
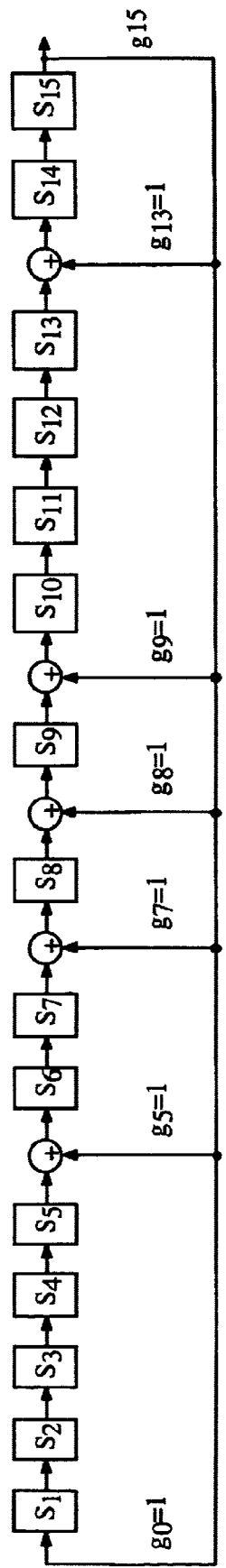

FIG. 1b depicts a shift-register implementation for generating the $PN_I$ sequence. Note that in accordance with FIG. 1a, only the '1' valued coefficients $g_{15}, g_{13}, g_9, g_8, g_7, g_5, g_0$, are present.

The short-code $PN_Q$ sequence satisfies a linear recursion specified by the following generator polynomial ($P_Q$):

$$P_Q(x) = x^{15} + x^{12} + x^{11} + x^{10} + x^6 + x^5 + x^4 + x^3 + 1. \tag{2}$$

Figure 1C:
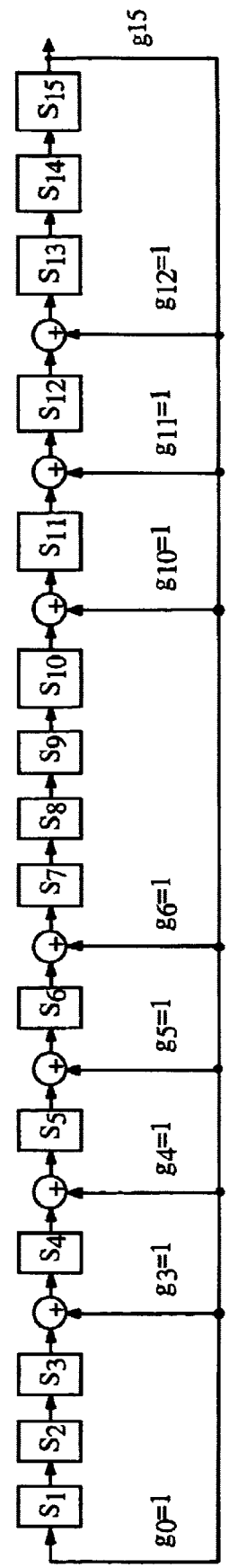

FIG. 1c depicts a shift-register implementation for generating the $PN_Q$ sequence.

Figure 1D:
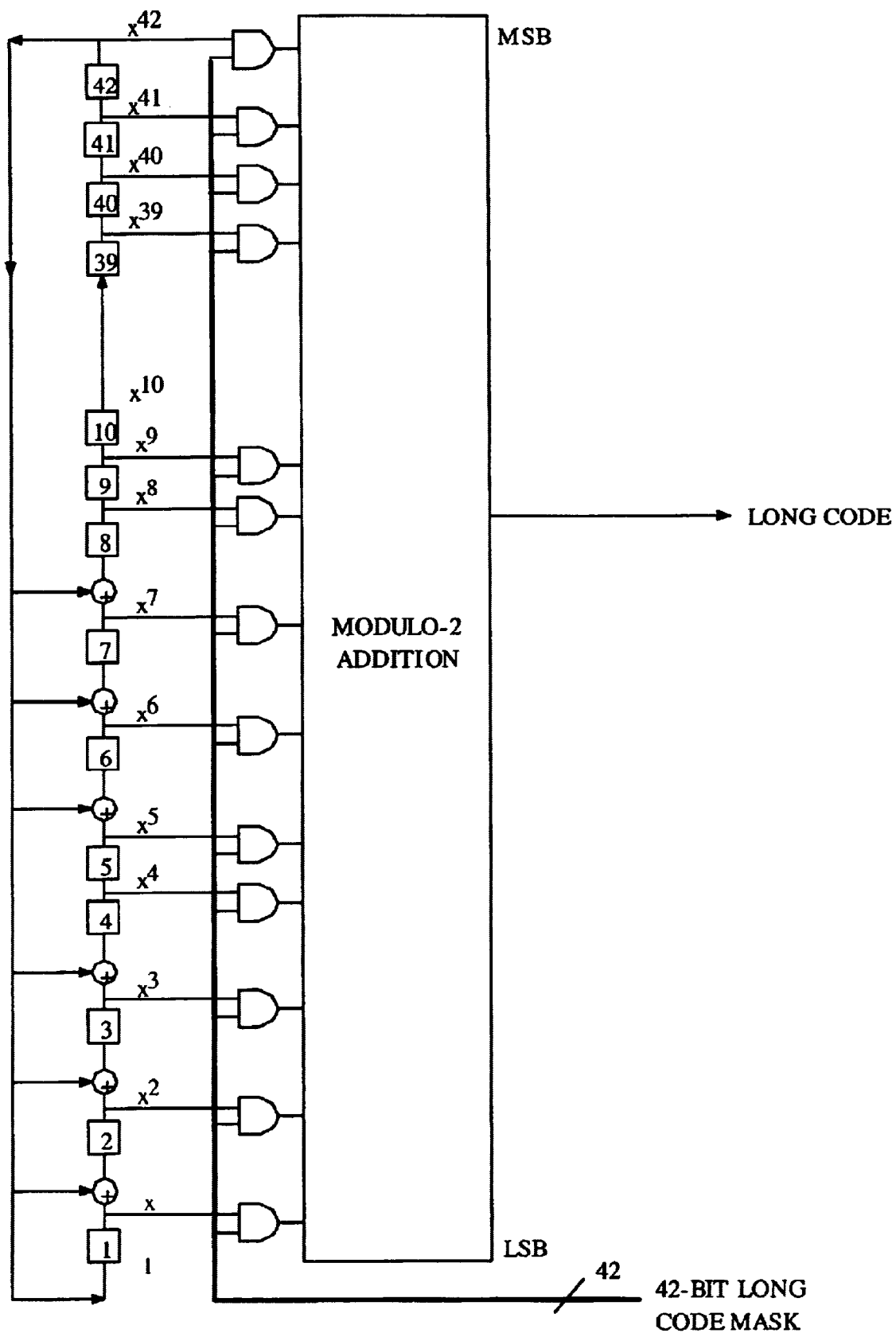

FIG. 1d shows a shift-register implementation of a long-code PN generator with a mask. The long-code is periodic, with period $2^{42}-1$ chips and satisfies a linear recursion specified by the following characteristic polynomial (P):

$$P(x) = x^{42} + x^{35} + x^{33} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x + 1. \tag{3}$$

The mask used for the long-code is channel type dependent, and can be found along with further details about the implementation of the PN generators in a document entitled "Physical Layer Standard for cdma2000 Spread Spectrum Systems."

Figure 2:
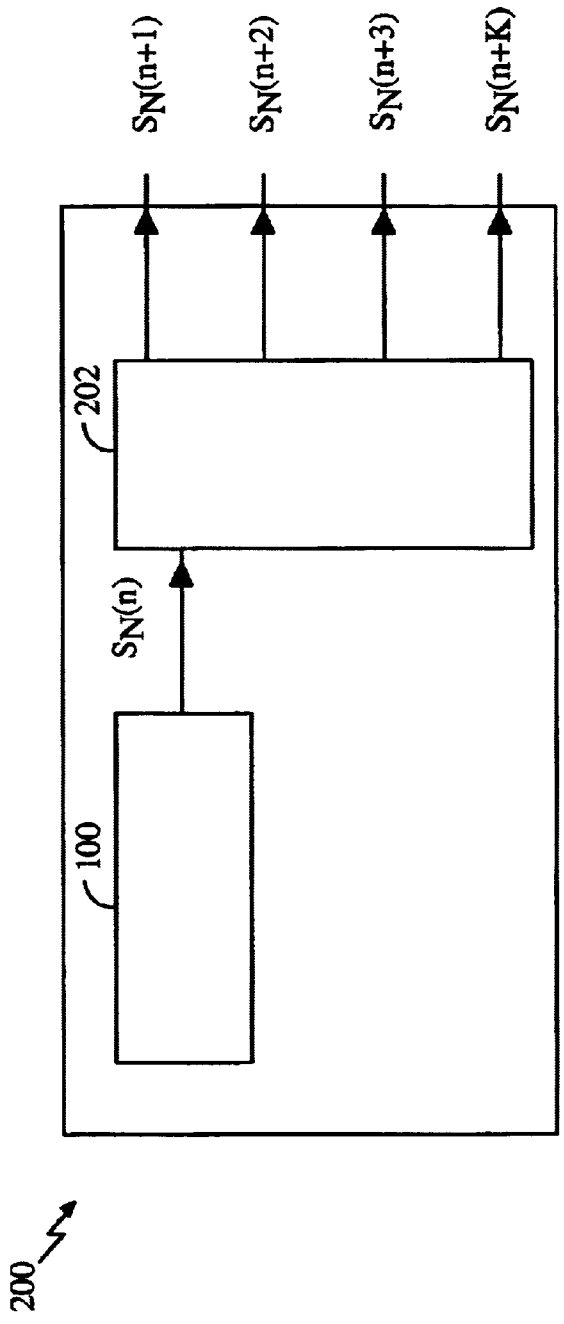
FIG. 2 depicts prior art of pseudonoise generators employed to generate parallel groups of PN sequence.

It is sometimes desired to obtain an output of a shift-register as a parallel combination of output state values $S_N(n), S_N(n+1), \ldots, S_N(n+K)$. FIG. 2 shows a block diagram of a parallel PN generator 200 according to the prior art. The PN generator comprises a shift-register 100 in accordance with a description for FIG. 1a, followed by a serial-to-parallel converter 202. The PN generator outputs K values of $S_N(n)$ for shift instances $n, n+1, \ldots, n+K$. However, there are K clock cycles required for generating the set of K output values. In the prior art understanding, in order to generate the parallel PN generator outputs, the outputs of the linear feedback shift-registers illustrated in FIGS. 1a and 1b are provided to the serial to parallel converter.

Figure 3:
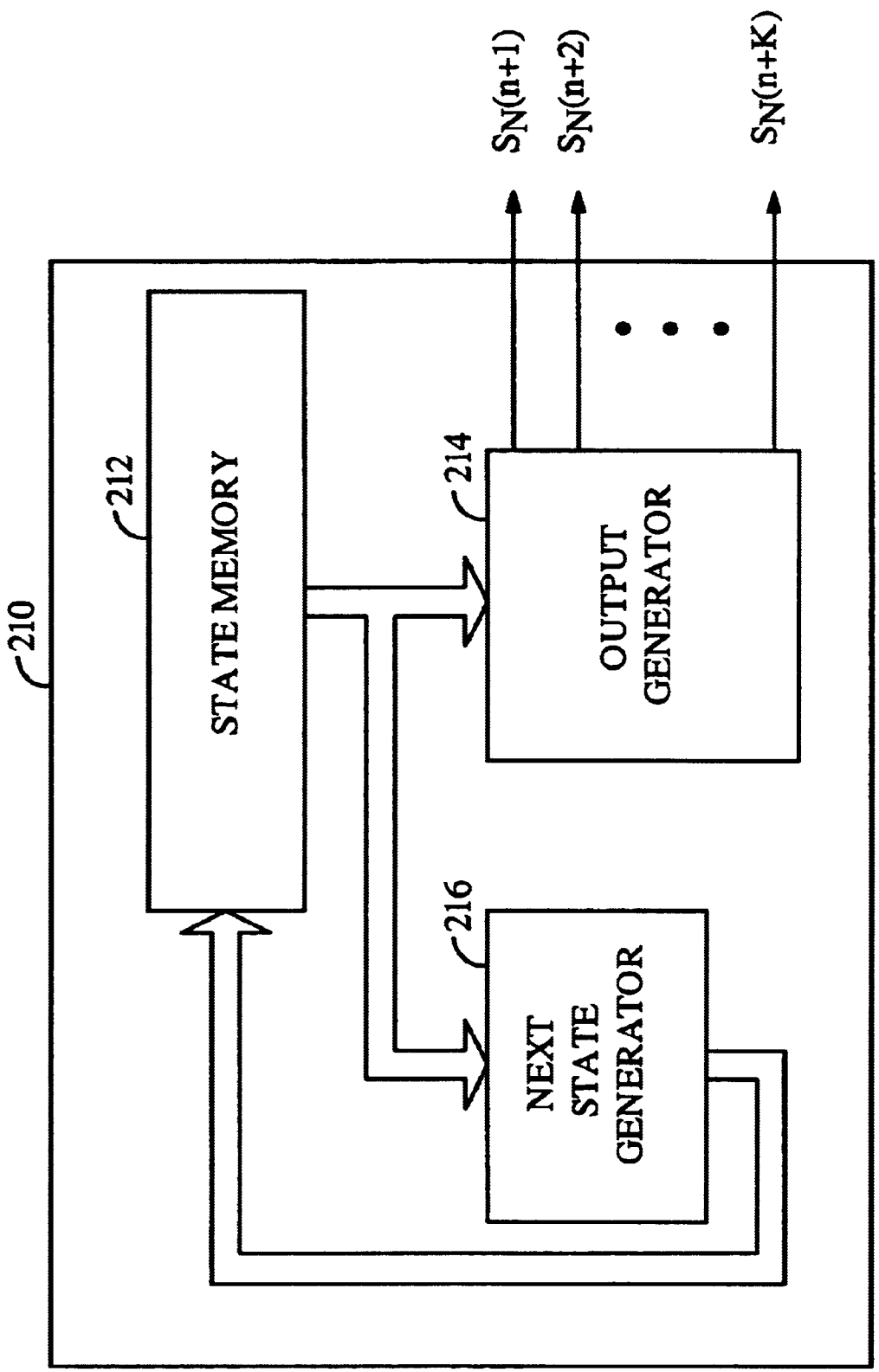
FIG. 3 is a block diagram illustrating the generalized operation of the present invention apparatus for generating the PN sequences.

FIG. 3 shows a block diagram of inventive alternative to the implementation of FIG. 2. In general, a relationship between values of shift register in a state (n) and next state (n+1) can be expressed as a system of equations:

$$S_N(n+1) = g_{11} \cdot S_N(n) + \ldots + g_{1N-1} \cdot S_2(n) + g_{1N} \cdot S_1(n) \tag{4a}$$

$$S_2(n+1) = g_{N-11} \cdot S_N(n) + \ldots + g_{N-1N-1} \cdot S_2(n) + g_{2N} \cdot S_1(n) \tag{4n-1}$$

$$S_1(n+1) = g_{N1} \cdot S_N(n) + \ldots + g_{NN-1} \cdot S_{2N-1}(n) + g_{NN} \cdot S_1(n) \tag{4n}$$

Such a system of equations can be re-written in a matrix form as:

$$S(n+1) = G * S(n), \tag{5}$$

where:

S(n+1) is a column matrix containing the state values of the state after a shift, G is a coefficient matrix comprising the g values indicated in equations 4a–4n, and S(n) is a column vector of present states.

Once a state after a shift has been determined, the next state can be calculated using equation (5):

$$S(n+2) = G * S(n+1). \tag{6}$$

Substituting equation (5) into equation (10) then results into an equation:

$$S(n+2) = G * G * S(n) = G^2 * S(n). \tag{7}$$

Further generalization of equation (11) yields an equation:

$$S(n+k) = G^k * S(n). \tag{8}$$

where k is a number expressing a state, in which an output is to be computed.

Applying these principles to FIG. 1, it is obvious that a value of a certain register in next state $S_1(n+1)$ is a function of a value of the preceding register in current state $S_{1-1}(n)$, and—if a feedback exists—a value of the output register in current state $S_N(n)$. Consequently, the system of equations (4) will have at most two non-zero coefficients in each of the equations (4a) through (4n).

As an example, the G matrix for a $PN_I$ shift-register in accordance with FIG. 1b will be developed as follows:

Observing, that there is a connection between stages $S_{15}$ and $S_{14}$ and no feedback from stage $S_{15}$, it follows that the next state value of $S_{15}$ is equal to previous state value of $S_{14}$. Thus, equation (4a) will take a form:

$$S_{15}(n+1) = 0 \cdot S_{15}(n) + 1 \cdot S_{14}(n) \tag{9}$$

Consequently, the first row of matrix G will contain a non-zero element only in a position $g_{12}$:

$$G_1 = [010000000000000] \tag{10}$$

Equivalent relation will hold for all stages an input of which is an output of another stage.

Turning to the next stage $S_{14}$, one can observe that its next state value is equal to previous state value of stage $S_{13}$ summed with a previous state value of stage $S_{15}$. Thus, the equation (4b) will take a form:

$$S_{14}(n+1)=1 \cdot S_{15}(n)+1 \cdot S_{13}(n) \tag{11}$$

Consequently, the second row of matrix G will contain a non-zero (unity) element in a position $g_{21}$, and $g_{23}$:

$$G_2=[010000000000000] \tag{10}$$

Equivalent relation will hold between all stages an input of which is a sum of outputs of two stages.

Reference back to FIG. 3 will expand on these concepts. State memory 212 is initialized to an initial set of states $S_1(n), S_2(n), \ldots, S_N(n)$. These states are then provided to an output generator 214, and a next state generator 216. Next state generator 216 contains a coefficient matrix $G_{NS}$ formed in accordance with the principles outlined in description of equations (4) and (5). In the exemplary embodiment, the generator polynomial has relatively few feedback taps and, consequently, the resultant matrix G is sparse. This sparseness permits a relatively simple implementation of the matrix operation to be performed using fixed Boolean operator programmed into a field programmable gate array or designed into an application specific integrated circuit (ASIC).

Next state generator 216 accepts the set of states $S_1(n), S_2(n), \ldots, S_N(n)$ from state memory 212 to compute a set of new states $S_1(n+K), S_2(n+K), \ldots, S_N(n+K)$ in accordance with equation (12), and provides the set of new states back to the state memory 212.

The output generator 214 performs a matrix operation on the current states in accordance with a matrix $G_{OS}$ formed as follows. As explained in description to FIG. 1a, the output of a shift-register is the state $S_N(n)$. From equation (8) follows that:

$$S(n+0)=G^0 * S(n). \tag{13}$$

where $G^0$ is a matrix having non-zero elements only in the main diagonal. Inspecting the system of equations (4), it is obvious that value $S_N(n)$ can be calculated using equation (4a). This equation is equivalent to forming a row matrix $G_R$ by taking the first row of a matrix $G_{NS}{}^0$ and multiplying it by a column matrix of states S formed from values $S_1(n), S_2(n), \ldots, S_N(n)$. Therefore, the first row of a matrix $G_{NS}$ becomes the last row of matrix $G_{OS}$. Similarly, from equation (8), the value $S_N(n+1)$ can be calculated by forming a row matrix $G_R$ by taking the first row of a matrix $G_{NS}{}^2$, and multiplying it by a column matrix of states S. Thus, the last row of a matrix $G_{NS}$ becomes the last but one row of matrix $G_{OS}$. This process of forming the matrix $G_{OS}$ continues until all K rows are filled. In mathematical terms:

$$G_{OS} = \begin{bmatrix} G_{NS}^K \\ \vdots \\ G_{NS}^1 \\ G_{NS}^0 \end{bmatrix}, \tag{14}$$

where $G_{NS}{}^k$ is last row of matrix $G_{NS}{}^k$.

Once matrix $G_{OS}$ has been formed, the output generator 214 computes the values $S_N(n+1), S_N(n+2), \ldots, S_N(n+K)$ by multiplying the matrix $G_{OS}$ by a column matrix of states S:

$$S_N(n+K)=G_{OS} \cdot S(n) \tag{15}$$

A long-code output generator 214 differs from the structure of short-code output generator. The reason is that the long-code generator contains a mask, which can be different for each long-code generator, see, "The cdma2000 ITU-R RTT Candidate Submission" and FIG. 1d. The PN output bit of the long code is a modulo-2 addition of values of the shift registers multiplied by the mask. The output bit can be expressed in matrix notation as follows:

$$pn_{OUT}(n)=M*S(n), \tag{16}$$

where:

$pn_{OUT}(n)$ is an output bit in a state n, and

M is a column mask matrix.

Substituting equation (8) into equation (16) results in:

$$pn_{OUT}(n+k)=M*G^{k}*S(n), \tag{17}$$

From equation (10) follows that desired output of K+1 parallel bits can be achieved by forming matrix $G_{OSL}$ $$G_{OSL} = \begin{bmatrix} M * G_{NSL}^K \\ \vdots \\ M * G_{NSL}^1 \\ M * G_{NSL}^0 \end{bmatrix}, \tag{18}$$

and, once matrix $G_{OSL}$ has been formed, the output generator 214 computes the values $pn(n), pn(n+1), \ldots, pn(n+K)$ by multiplying the matrix $G_{OSL}$ by a column matrix of states S:

$$pn(n+K)=G_{OSL} \cdot S(n), \tag{19}$$

At this point of the process the set of states, $S_1(n+K), S_2(n+K), \ldots, S_N(n+K)$ is provided to an output generator 214, a next state generator 216, and the whole cycle is repeated.

In particular, let us consider the G matrix for a $PN_I$ shift-register to be the basic next state generator matrix $G_{NSI}$:

$$G_{NSII} = \begin{bmatrix} 0100000000000000 \\ 1010000000000000 \\ 0001000000000000 \\ 0000100000000000 \\ 0000010000000000 \\ 1000001000000000 \\ 1000000100000000 \\ 1000000010000000 \\ 0000000001000000 \\ 1000000000100000 \\ 0000000000010000 \\ 0000000000001000 \\ 0000000000000100 \\ 0000000000000010 \\ 0000000000000001 \\ 1000000000000000 \end{bmatrix}$$

Matrix $G_{NSI}{}^0$ is as follows:

$$G_{NSI0} = \begin{bmatrix} 100000000000000 \\ 010000000000000 \\ 001000000000000 \\ 000100000000000 \\ 000010000000000 \\ 000001000000000 \\ 000000100000000 \\ 000000010000000 \\ 000000001000000 \\ 000000000100000 \\ 000000000010000 \\ 000000000001000 \\ 000000000000100 \\ 000000000000010 \\ 000000000000001 \end{bmatrix}$$

Taking the first row of matrix $G_{NSI}{}^0$ and last row of matrix $G_{NSI}$, the matrix $G_{OSI2}$ is formed as follows:

$$G_{OSI2} = \begin{bmatrix} 010000000000000 \\ 100000000000000 \end{bmatrix}$$

One ordinarily skilled in the art will recognize that matrix $G_{OS}$ can be modified according to desired PN generator output, without departing from the scope of the invention. For example, if a parallel output $S_N(n)$, $S_N(n+2)$, $S_N(n+4)$, and $S_N(n+6)$ is desired, matrix $G_{OS}$ will comprise in accordance with equation (14) first row of $G_{NS}{}^6$ in row one, first row of $G_{NS}{}^4$ in row two, first row of $G_{NS}{}^2$ in row three, and first row of $G_{NS}{}^0$ in row four.

Figure 4:
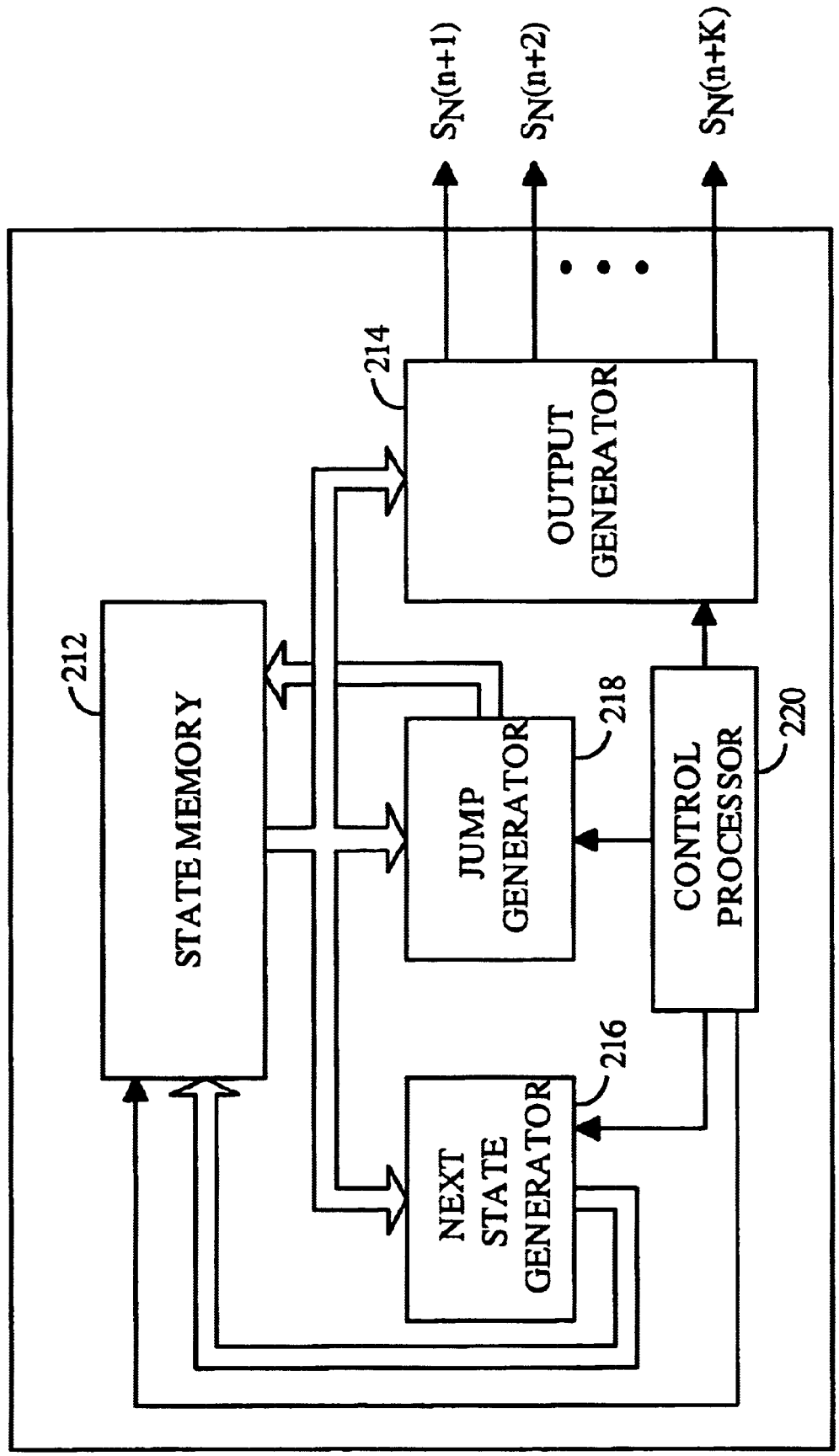
FIG. 4 shows one embodiment of the invention.

FIG. 4 depicts a block diagram of a preferred embodiment of the parallel PN generator. In addition to the state memory 212, the output generator 214, and a next state generator 216, it contains a jump generator 218 and a control processor 220. The function of the jump generator 218 is to advance the state by predetermined number of shifts. Such a function is desirable e.g., for forward link acquisition as described in aforementioned U.S. Pat. Nos. 5,644,591 and 5,805,648. In the exemplary embodiment, the PN generator is employed in a receiver in accordance to an IS-95 standard. The systems designed in accordance with an IS-95 standard comprise base stations utilizing a common PN generator, with a phase offset in increments of 64 chips for a particular pilot signal. Consequently, the jump generator 218 is functionally equivalent to next state generator 216 in that it comprises a coefficient matrix $G_{JS}$ formed in accordance with the principles outlined in description of FIG. 1a, and raised to the power of 64.

Next state generator 216 receives the set of states $S_1(n)$, $S_2(n)$, ..., $S_N(n)$ from state memory 212 and generates a set of new states $S_1(n+64)$, $S_2(n+64)$, ..., $S_N(n+64)$ in accordance with equation (8), and provides the set of new states back to state memory 212. The reason for having a separate next state generator 216 and a jump generator 218 is that in general K≠L, and, consequently, the matrices $G_{OS}$ and $G_{JS}$ are different. As described above, the present invention is preferably implemented in hardware adapted to the specific operation and designed to perform a specific task.

The function of the control processor 220 is to coordinate cooperation between the different subsystems, and to control bit stuffing. As described, the short-code PN sequences have a period of $2^{15}$ generating polynomials, and from them derived matrices, generate only sequences with period $2^{15}-1$. The control processor 200 monitors the output of the next state generator 216 for the state preceding the state corresponding to a period $2^{15}-1$, for which a computation of next state according to equation (8) would exceed the state corresponding to a period $2^{15}-1$. Once the control processor 200 detects such state it performs two operations. It will cause the output generator 214 to compute the output state values, and overwrites the last output state value with '0'. It will then avoid writing the output of the next state generator 216 into state memory 212, and will initialize the state memory 212 to initial set of states $S_1(n)$, $S_2(n)$, ..., $S_N(n)$.

Figure 5:
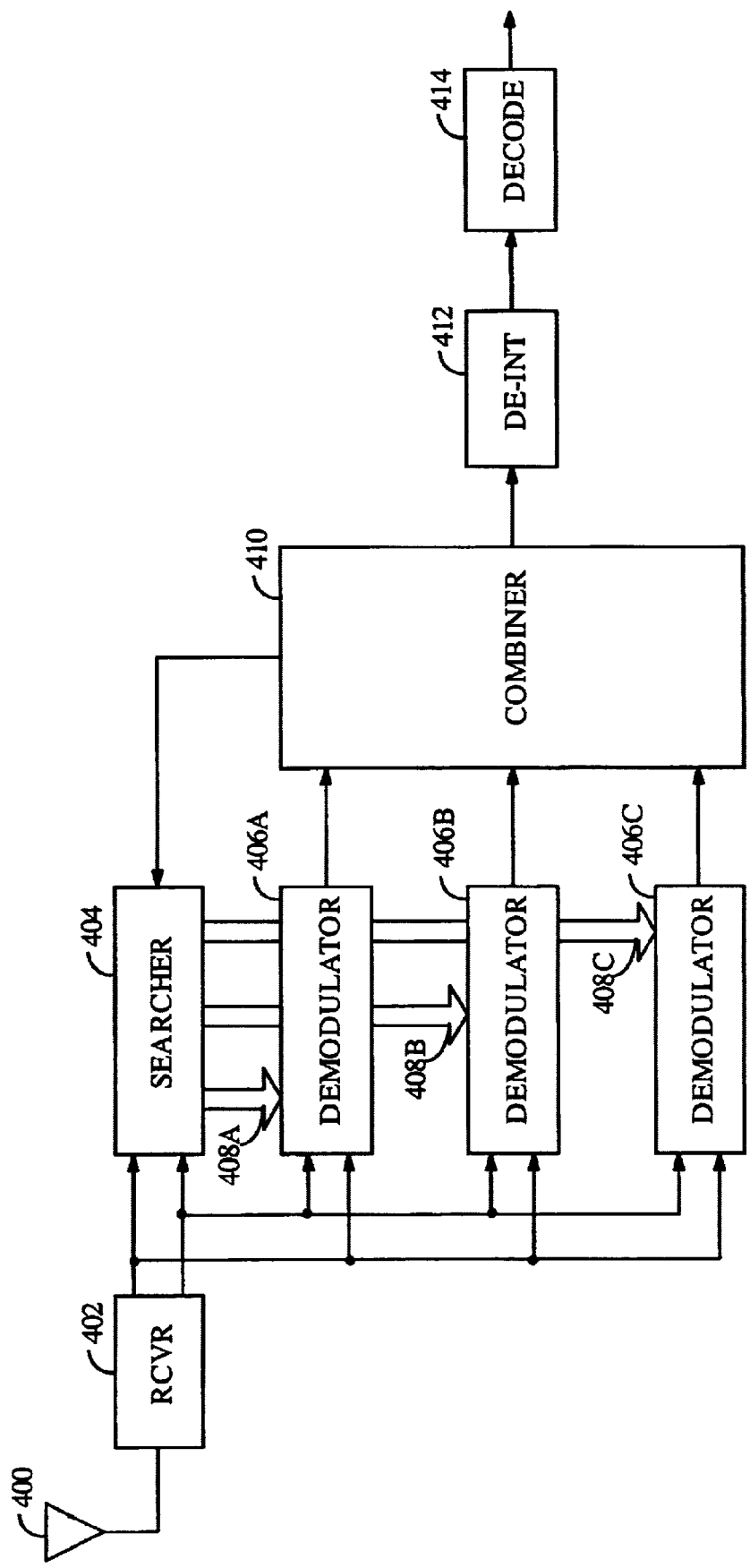
FIG. 5 is a simplified block diagram of an exemplary receiver chain using PN generators in accordance with the invention.

FIG. 5 depicts a simplified block diagram of an exemplary receiver chain using PN generators in accordance with the invention. The RF signal arriving at the antenna 400 is provided to the receiver (RCVR) 402, which downconverts the received signal to a baseband frequency, producing I and Q components of the signal. These components are simultaneously provided to a searcher 404 and demodulators 406a, ..., 406c. The task of the searcher 404 is to perform searches in code space to identify candidate signals to be added to the Active Set of the remote station in order to maximize the quality of the received signal. To accomplish this task, searcher 404 will control parameters of the PN sequences generators, devised in accordance with the principles outlined in present invention. An exemplary method for performing acquisition and searching in a CDMA communication system is described in detail in aforementioned U.S. Pat. Nos. 5,644,591 and 5,805,648

In order to be effective, a receiver must be able to operate in a multipath environment and must be able to adapt to changes in physical location. In the aforementioned U.S. Pat. Nos. 5,101,501 and 5,109,390, a method for exploiting the reception of multiple version of a signal is described. Demodulators 406a, 406b and 406c demodulate redundant versions of the same signal. This redundant version either correspond to multipath propagations of a signal from a single source or from multiple transmissions of the same information from multiple base stations in a soft handoff condition.

The demodulated signals from demodulators 406a, ..., 406c are provided to combiner 410, which combines the signals and provides them for further processing to a de-interleaver 412 and decoder 414.

Figure 6:
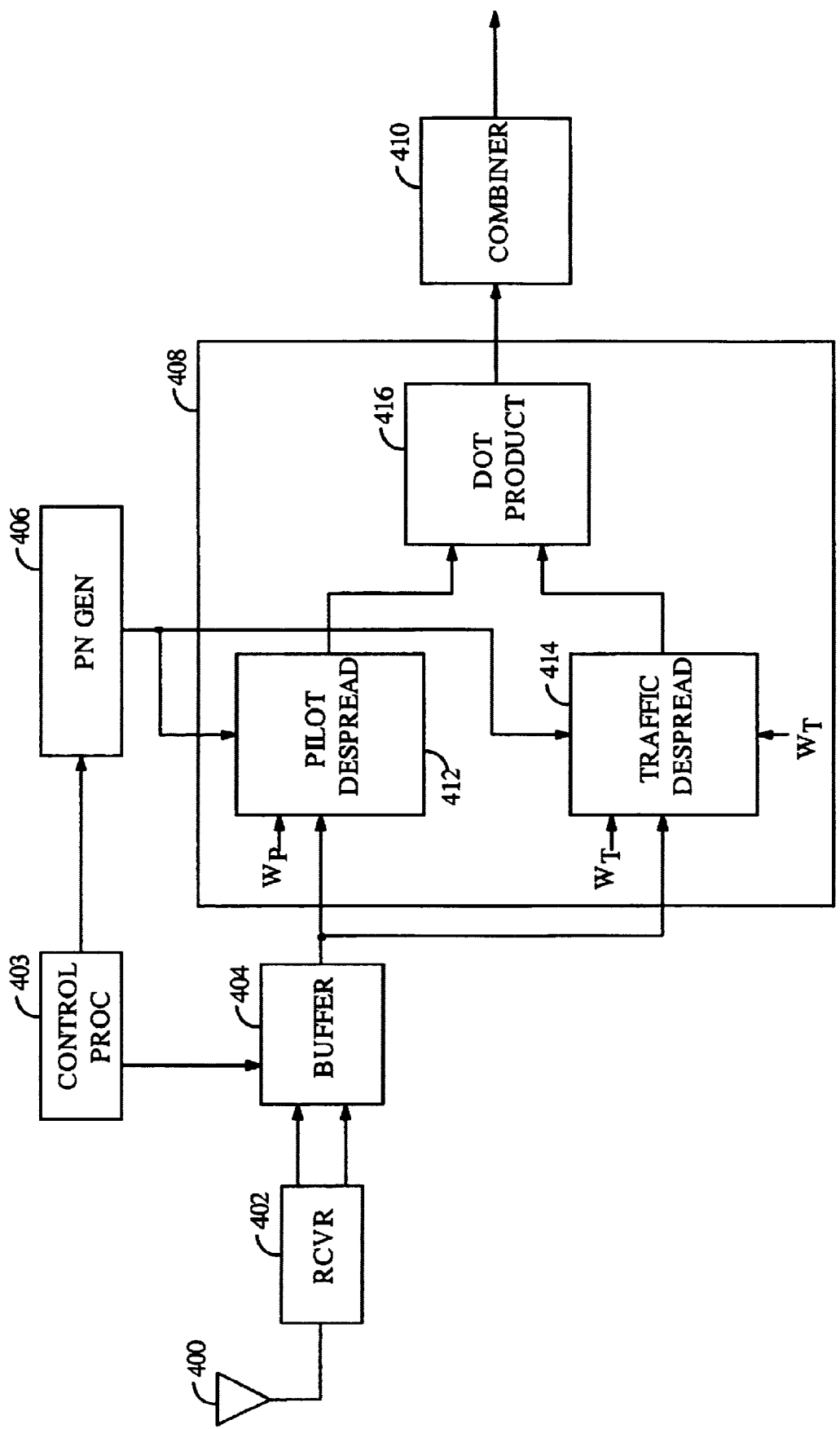
FIG. 6 is a block diagram of a part of an exemplary single demodulation chain using PN generators in accordance with the invention.

FIG. 6 illustrates the exemplary embodiment of the receiver structure of the present invention. The signal is received at antenna 400 and provided to receiver (RCVR) 402. Receiver 402 downconverts, amplifies, filters, and samples the received signal, and provides digital samples to buffer 404. In response to signals from control processor 403, a selected set of samples from buffer 404 is provided to despreader 408. In addition, in response to a signal from control processor 403, PN generator 406 provides a portion of a PN sequence to depreader 408.

Despreader 408 despreads the signal in accordance with the portion of the PN sequence provided by PN generator 406 which operates in accordance with the present invention. Within despreader 408 the PN sequence is provided to pilot despreader 412, which despreads the received signal in accordance with the portion of the short PN sequence provided by PN generator 406 and the Walsh covering sequence for the pilot signal. In the exemplary embodiment, the pilot signal is covered with the Walsh zero sequence and as such does not effect the despreading operation performed by pilot despreader 412. In addition, the portion of the short PN sequence is provided to traffic despreader 414, which despreads the signal in accordance with the short PN sequence and the Walsh traffic covering sequence $W_T$.

The result of the despreading operation performed by pilot despreader 412 and the result of the despreading operation performed by traffic despreader 414 are provided to dot product circuit 416. The pilot signal has known symbols and can be used to remove the phase ambiguities introduced by the propagation path as described in the aforementioned U.S. Pat. No. 5,506,865. The result of the dot product operation is provided to combiner 410. Combiner 410 combines redundantly despread version of the same symbols whether transmitted by different base stations in a soft handoff environment or by the same base station traversing different propagation paths in a multipath environment.

In accordance with an exemplary demodulation chain embodiment, and previous discussion follows that a first set of matrices is required for the short-code PN generator for the I component, a second set for the short-code PN generator for the Q component, and a third set for the long-code PN generator.

1. Acquisition Mode.

In the exemplary embodiment, the receiver is able to rapidly determine jump 64 chips ahead in the PN sequence in order to perform a correlation process to determine the correlation energy of between the received signal and a portion of the PN sequence.

In the generation of the short $PN_I$ sequence, state memory 212 provides the current state of the PN sequence $S(n)$ to next state generator 216. Next state generator 216 generates the state of the PN sequence $S(n+2)$ two cycles in advance by left-multiplying the PN sequence $S(n)$ by the matrix $G_{NSI2}$:

$$G_{NSI2} = \begin{bmatrix} 101000000000000 \\ 010100000000000 \\ 000010000000000 \\ 000001000000000 \\ 100000100000000 \\ 110000010000000 \\ 110000001000000 \\ 010000000100000 \\ 100000000010000 \\ 010000000001000 \\ 000000000000100 \\ 000000000000010 \\ 000000000000001 \\ 100000000000000 \\ 010000000000000 \end{bmatrix}$$

In the generation of the short $PN_I$ sequence, state memory 212 provides the current state of the PN sequence $S(n)$ to jump generator 218. Jump generator 218 generates the state of the PN sequence $S(n+2)$ sixty-four (64) cycles in advance by left-multiplying the PN sequence $S(n)$ by the matrix $G_{JSI64}$:

$$G_{JSI64} = \begin{bmatrix} 101011010100101 \\ 010101101010010 \\ 000001100001100 \\ 000000110000110 \\ 000000011000011 \\ 000000001100001 \\ 101011010010101 \\ 011110111101111 \\ 000100001010010 \\ 000010000101001 \\ 101010010110001 \\ 110101001011000 \\ 011010100101100 \\ 101101010010110 \\ 010110101001011 \end{bmatrix}$$

In the generation of the short $PN_I$ sequence, the next state generator 216 or the jump generator 218 provides the current state of the PN sequence $S(n)$ to output generator 214. Output generator 214 computes the values $S_N(n+1)$, $S_N(n+2)$, ..., $S_N(n+K)$ left-multiplying a column matrix of states $S(n)$ by the matrix $G_{OSI2}$:

$$G_{OSI2} = \begin{bmatrix} 010000000000000 \\ 100000000000000 \end{bmatrix}$$

The short-code PN generator for the Q component 518 uses an algorithm for PN sequence generation, identical to the one for the acquisition mode. Consequently, the set of matrices as well as their application is identical.

$$G_{NSQ2} = \begin{bmatrix} 001000000000000 \\ 100100000000000 \\ 110010000000000 \\ 110001000000000 \\ 010000100000000 \\ 000000010000000 \\ 000000001000000 \\ 100000000100000 \\ 110000000010000 \\ 110000000001000 \\ 110000000000100 \\ 010000000000010 \\ 000000000000001 \\ 100000000000000 \\ 010000000000000 \end{bmatrix}$$

$$G_{JSQ64} = \begin{bmatrix} 100011001011100 \\ 010001100101110 \\ 001000110010111 \\ 000111010010111 \\ 100000100010111 \\ 110011011010111 \\ 011001101101011 \\ 101100110110101 \\ 110110011011010 \\ 011000000110001 \\ 101111001000100 \\ 110100101111110 \\ 011001011100011 \\ 001100101110001 \\ 000110010111000 \end{bmatrix}$$

$$G_{OSQ2} = \begin{bmatrix} 010000000000000 \\ 100000000000000 \end{bmatrix}$$

In the generation of the long-code PN sequence, state memory 212 provides the current state of the PN sequence $S(n)$ to next state generator 216. Next state generator 216 generates the state of the PN sequence $S(n+2)$ two cycles in advance by left-multiplying the PN sequence $S(n)$ by the matrix $G_{NSL2}$:

$$G_{NSL2} = \begin{bmatrix} \text{(42×42 binary matrix)} \end{bmatrix}$$

In the generation of the long-code PN sequence, state memory 212 provides the current state of the PN sequence S(n) to jump generator 218. Jump generator 218 generates the state of the PN sequence S(n+64) sixty-four (64) cycles in advance by left-multiplying the PN sequence S(n) by the matrix $G_{JSL64}$:

$$G_{JSL64} = \begin{bmatrix} \text{(binary matrix)} \end{bmatrix}$$

In the generation of the long-code PN sequence, the next state generator 216 or the jump generator 218 provides the current state of the PN sequence S(n) to output generator 214. Output generator 214 first computes the output state matrix $G_{OSL}$ by left-multiplying matrix M by matrices $G_{NSL0}$:

$$G_{NSL0} = \begin{bmatrix} \text{(binary matrix)} \end{bmatrix}$$

, and by matrix $G_{NS1}$:

$$G_{NSL1} = \begin{bmatrix} 1000000000000000000000000000000000000000 \\ 0100000000000000000000000000000000000000 \\ 0010000000000000000000000000000000000000 \\ 0001000000000000000000000000000000000000 \\ 0000100000000000000000000000000000000000 \\ 0000010000000000000000000000000000000000 \\ 0000001000000000000000000000000000000000 \\ 0000000100000000000000000000000000000000 \\ 0000000010000000000000000000000000000000 \\ 0000000001000000000000000000000000000000 \\ 0000000000100000000000000000000000000000 \\ 0000000000010000000000000000000000000000 \\ 0000000000001000000000000000000000000000 \\ 0000000000000100000000000000000000000000 \\ 0000000000000010000000000000000000000000 \\ 0000000000000001000000000000000000000000 \\ 0000000000000000100000000000000000000000 \\ 0000000000000000010000000000000000000000 \\ 0000000000000000001000000000000000000000 \\ 0000000000000000000100000000000000000000 \\ 0000000000000000000010000000000000000000 \\ 0000000000000000000001000000000000000000 \\ 0000000000000000000000100000000000000000 \\ 0000000000000000000000010000000000000000 \\ 0000000000000000000000001000000000000000 \\ 0000000000000000000000000100000000000000 \\ 0000000000000000000000000010000000000000 \\ 0000000000000000000000000001000000000000 \\ 0000000000000000000000000000100000000000 \\ 0000000000000000000000000000010000000000 \\ 0000000000000000000000000000001000000000 \\ 0000000000000000000000000000000100000000 \\ 0000000000000000000000000000000010000000 \\ 0000000000000000000000000000000001000000 \\ 0000000000000000000000000000000000100000 \\ 0000000000000000000000000000000000010000 \\ 0000000000000000000000000000000000001000 \\ 0000000000000000000000000000000000000100 \\ 0000000000000000000000000000000000000010 \\ 0000000000000000000000000000000000000001 \end{bmatrix}$$

and then computes the output bits $pn_{OUT}(n+k)$ by multiplying the resulting matrix $G_{OSL}$ by a column matrix of states S.

2. Demodulation Mode:

The demodulation mode uses algorithm for PN sequence generation, identical to the one for the acquisition mode. Consequently, the set of matrices as well as their application is identical.

The short-code PN generator for the I component 516 comprises the following matrices:

$$G_{NSI8} = \begin{bmatrix} 010010101000000 \\ 001001010100000 \\ 110110000010000 \\ 111011000001000 \\ 011101100000100 \\ 101110110000010 \\ 000101110000001 \\ 010000010000000 \\ 011010100000000 \\ 001101010000000 \\ 010100000000000 \\ 101010000000000 \\ 010101000000000 \\ 001010100000000 \\ 100101010000000 \end{bmatrix}$$

$$G_{JSI64} = \begin{bmatrix} 101011010100101 \\ 010101101010010 \\ 000001100001100 \\ 000000110000110 \\ 000000011000011 \\ 000000001100001 \\ 101011010010101 \\ 011110111101111 \\ 000100001010010 \\ 000010000101001 \\ 101010010110001 \\ 110101001011000 \\ 011010100101100 \\ 101101010010110 \\ 010110101001011 \end{bmatrix}$$

$$G_{OSI8} = \begin{bmatrix} 100101010000000 \\ 001010100000000 \\ 010101000000000 \\ 101010000000000 \\ 010100000000000 \\ 101000000000000 \\ 010000000000000 \\ 100000000000000 \end{bmatrix}$$

The short-code PN generator for the Q component 518 comprises the following matrices:

$$G_{NSQ8} = \begin{bmatrix} 101111001000000 \\ 010111100100000 \\ 101011110010000 \\ 011010110001000 \\ 000010010000100 \\ 001110000000010 \\ 100111000000001 \\ 110011100000000 \\ 111001110000000 \\ 010011110000000 \\ 000110110000000 \\ 101100010000000 \\ 111001000000000 \\ 111100100000000 \\ 011110010000000 \end{bmatrix}$$

$$G_{JSQ64} = \begin{bmatrix} 100011001011100 \\ 010001100101110 \\ 001000110010111 \\ 000111010010111 \\ 100000100010111 \\ 110011011010111 \\ 011001101101011 \\ 101100110110101 \\ 110110011011010 \\ 011000000110001 \\ 101111001000100 \\ 110100101111110 \\ 011001011100011 \\ 001100101110001 \\ 000110010111000 \end{bmatrix}$$

$$G_{OSQ8} = \begin{bmatrix} 011110010000000 \\ 111100100000000 \\ 111001000000000 \\ 110010000000000 \\ 100100000000000 \\ 001000000000000 \\ 010000000000000 \\ 100000000000000 \end{bmatrix}$$

The long-code PN generator for 518 comprises the following matrices:

$$G_{NSL8} = \begin{bmatrix} 0100000010000000000000000000000000000000 \\ 1010000001000000000000000000000000000000 \\ 0101000000100000000000000000000000000000 \\ 1010100000010000000000000000000000000000 \\ 0101010000001000000000000000000000000000 \\ 0010101000000100000000000000000000000000 \\ 1001010100000010000000000000000000000000 \\ 1000101010000001000000000000000000000000 \\ 0100010101000000100000000000000000000000 \\ 1110001010000000010000000000000000000000 \\ 1111000100000000001000000000000000000000 \\ 0011100000000000000100000000000000000000 \\ 1001110000000000000010000000000000000000 \\ 1100111000000000000001000000000000000000 \\ 1110011100000000000000100000000000000000 \\ 0011001100000000000000010000000000000000 \\ 0101100100000000000000001000000000000000 \\ 1110110000000000000000000100000000000000 \\ 1111011000000000000000000010000000000000 \\ 1111101100000000000000000001000000000000 \\ 1011110100000000000000000000100000000000 \\ 0001111000000000000000000000010000000000 \\ 1000111100000000000000000000001000000000 \\ 1000011110000000000000000000000100000000 \\ 0000001100000000000000000000000010000000 \\ 1100000100000000000000000000000001000000 \\ 0010000000000000000000000000000000100000 \\ 1001000000000000000000000000000000010000 \\ 1100100000000000000000000000000000001000 \end{bmatrix}$$

$$\begin{bmatrix} 1110010000000000000000000000000000010000 \\ 0111001000000000000000000000000000001000 \\ 0011100100000000000000000000000000000100 \\ 1101110000000000000000000000000000000010 \\ 1110111000000000000000000000000000000001 \\ 0111011100000000000000000000000000000000 \\ 1111101100000000000000000000000000000000 \\ 1011110100000000000000000000000000000000 \\ 0001111000000000000000000000000000000000 \\ 1000111100000000000000000000000000000000 \\ 1000011100000000000000000000000000000000 \\ 1000001100000000000000000000000000000000 \\ 1000000010000000000000000000000000000000 \end{bmatrix}$$

$$G_{JSL64} = \begin{bmatrix} 0111001000110111011110111111100100001111110 \\ 1011100100011011101111011111100100001111111 \\ 0101110010001101110111101111110010000011111 \\ 0010111001000110111011110111111001000001111 \\ 1001011100100011011101111011111110010000111 \\ 1100101110010001101110111101111111001000011 \\ 0110010111001000110111011110111111100100001 \\ 0100000110100110001010100000010111111011110 \\ 0010000001101001100010101000000101111110111 \\ 0110001000000011101111101011001101100000101 \\ 0011000100000001110111110101100110110000010 \\ 1110101010110011001010000101111101110011111 \\ 0111010101011001110001010001011111011100111 \\ 1011101010101101110010100010101111011001111 \\ 1011101010101101111001010001011110111001111 \\ 0101110101010110111100101000010111101100011 \\ 0101110010011100000001010110111111110011111 \\ 0101110001111001011110101010100110011111001 \\ 0101110000001011110001101010011011101100110 \\ 0010111000000010111100011010100110110110010 \\ 1001011100000010111100011010100110111101100 \\ 0011100110110110100001010000100101100010000 \\ 0110111011101100011110100110000101111111010 \\ 1011011101110110001111010011000001011111101 \\ 0010100110001100011100101010110100100000000 \\ 1110011011110001010010010100011100111111110 \\ 0000000101001111101011111010100011000000001 \\ 0111001010010000100101010010110110111111100 \\ 0011100101001000010010100101101011010111111 \\ 1001110010100100001010000101101011011111111 \end{bmatrix}$$

$$\begin{bmatrix} 1100111001010010000100101000101101011011011111 \\ 0110011100101001000010010100101101010110111111 \\ 0011001110010100100001001010010110101101011011 \\ 0110101111111010011001010001101111010001100100011 \\ 1011010111111101001110011010001101110001011101001 \\ 0101101011111110100011100110100011011110100 \\ 1101111101001000110110011100011001111000100 \\ 1001110110010011000101011001000010011100 \\ 0011110011111101110001001101010001100110 \\ 1001110011111101111000100111101010000111000 \\ 1011110100010001100111101110010110010 \\ 0010110010110011000100001011000100000111 \\ 1110010001101111011110111111100100001111110 \end{bmatrix}$$

$$G_{OSL18} = \begin{bmatrix} 10000001000000000000000000000000000000 \\ 01000000100000000000000000000000000000 \\ 10100000010000000000000000000000000000 \\ 01010000001000000000000000000000000000 \\ 10101000000100000000000000000000000000 \\ 01010100000010000000000000000000000000 \\ 00101010000001000000000000000000000000 \\ 00010101000000100000000000000000000000 \\ 10001010000000010000000000000000000000 \\ 11000101000000001000000000000000000000 \\ 11100010000000000100000000000000000000 \\ 01110000000000000010000000000000000000 \\ 00111000000000000001000000000000000000 \\ 10011100000000000000100000000000000000 \\ 11001110000000000000010000000000000000 \\ 01100111000000000000001000000000000000 \\ 10110010000000000000000100000000000000 \\ 11011000000000000000000010000000000000 \\ 11101100000000000000000001000000000000 \\ 11110110000000000000000000100000000000 \\ 01111010000000000000000000010000000000 \\ 00111100000000000000000000001000000000 \\ 00011110000000000000000000000100000000 \\ 00001110000000000000000000000010000000 \\ 00000110000000000000000000000001000000 \\ 10000010000000000000000000000000100000 \\ 01000000000000000000000000000000010000 \\ 00100000000000000000000000000000001000 \\ 10010000000000000000000000000001000000 \end{bmatrix}$$

$$\begin{bmatrix} 11001000000000000000000000000000100000 \\ 11100100000000000000000000000000010000 \\ 01110010000000000000000000000000001000 \\ 10111000000000000000000000000000000100 \\ 11011100000000000000000000000000000010 \\ 11101110000000000000000000000000000001 \\ 11111011000000000000000000000000000000 \\ 01111010000000000000000000000000000000 \\ 00111100000000000000000000000000000000 \\ 00011110000000000000000000000000000000 \\ 00001110000000000000000000000000000000 \\ 00000110000000000000000000000000000000 \\ 00000100000000000000000000000000000000 \end{bmatrix}$$

$$G_{OSL28} = \begin{bmatrix} 00000010000000000000000000000000000000 \\ 10000001000000000000000000000000000000 \\ 01000000100000000000000000000000000000 \\ 10100000010000000000000000000000000000 \\ 01010000001000000000000000000000000000 \\ 10101000000100000000000000000000000000 \\ 01010100000010000000000000000000000000 \\ 00101010000001000000000000000000000000 \\ 00010101000000100000000000000000000000 \\ 10001010000000010000000000000000000000 \\ 11000100000000001000000000000000000000 \\ 11100000000000000100000000000000000000 \\ 01110000000000000010000000000000000000 \\ 00111000000000000001000000000000000000 \\ 10011100000000000000100000000000000000 \\ 11001110000000000000010000000000000000 \\ 01100100000000000000001000000000000000 \\ 10110010000000000000000100000000000000 \\ 11011000000000000000000010000000000000 \\ 11101100000000000000000001000000000000 \\ 11110110000000000000000000100000000000 \\ 01111010000000000000000000010000000000 \\ 00111100000000000000000000001000000000 \\ 00011110000000000000000000000100000000 \\ 00001110000000000000000000000010000000 \\ 00000110000000000000000000000001000000 \\ 00000010000000000000000000000000100000 \\ 10000000000000000000000000000000010000 \\ 01000000000000000000000000000000001000 \\ 00100000000000000000000000000000000100 \end{bmatrix}$$

-continued $$\begin{bmatrix} 10010000000000000000000000000001000000 \\ 11001000000000000000000000000000100000 \\ 11100100000000000000000000000000010000 \\ 01110000000000000000000000000000001000 \\ 10111000000000000000000000000000000100 \\ 11011100000000000000000000000000000010 \\ 11101100000000000000000000000000000001 \\ 11111010000000000000000000000000000000 \\ 01111000000000000000000000000000000000 \\ 00111100000000000000000000000000000000 \\ 00011110000000000000000000000000000000 \\ 00001110000000000000000000000000000000 \\ 00000110000000000000000000000000000000 \\ 00000100000000000000000000000000000000 \end{bmatrix}$$

$$G_{OSL38} = \begin{bmatrix} 00000100000000000000000000000000000000 \\ 00000010000000000000000000000000000000 \\ 10000001000000000000000000000000000000 \\ 01000001000000000000000000000000000000 \\ 10100000100000000000000000000000000000 \\ 01010000010000000000000000000000000000 \\ 10101000001000000000000000000000000000 \\ 01010100000100000000000000000000000000 \\ 00101010000010000000000000000000000000 \\ 00010000000100000000000000000000000000 \\ 10001000000001000000000000000000000000 \\ 11000000000000100000000000000000000000 \\ 11100000000000010000000000000000000000 \\ 01110000000000001000000000000000000000 \\ 00111000000000000100000000000000000000 \\ 10011000000000000010000000000000000000 \\ 11001000000000000001000000000000000000 \\ 01100000000000000000100000000000000000 \\ 10110000000000000000010000000000000000 \\ 11011000000000000000001000000000000000 \\ 11101000000000000000000100000000000000 \\ 11110000000000000000000010000000000000 \\ 01111000000000000000000001000000000000 \\ 00111100000000000000000000100000000000 \\ 00011100000000000000000000010000000000 \\ 00001100000000000000000000001000000000 \\ 00000100000000000000000000000100000000 \\ 00000000000000000000000000000010000000 \\ 10000000000000000000000000000001000000 \\ 01000000000000000000000000000000100000 \end{bmatrix}$$

$$\begin{bmatrix} 00100000000000000000000000000010000000 \\ 10010000000000000000000000000001000000 \\ 11001000000000000000000000000000100000 \\ 11100000000000000000000000000000010000 \\ 01110000000000000000000000000000001000 \\ 10111000000000000000000000000000000100 \\ 11011000000000000000000000000000000010 \\ 11101000000000000000000000000000000001 \\ 11111000000000000000000000000000000000 \\ 01111000000000000000000000000000000000 \\ 00111000000000000000000000000000000000 \\ 00011000000000000000000000000000000000 \\ 00001000000000000000000000000000000000 \end{bmatrix}$$

$$G_{OSL48} = \begin{bmatrix} 000010000000000000000000000000000000000000 \\ 000001000000000000000000000000000000000000 \\ 000000100000000000000000000000000000000000 \\ 100000010000000000000000000000000000000000 \\ 010000001000000000000000000000000000000000 \\ 101000000100000000000000000000000000000000 \\ 010100000010000000000000000000000000000000 \\ 101000000001000000000000000000000000000000 \\ 010100000000100000000000000000000000000000 \\ 001000000000100000000000000000000000000000 \\ 000100000000010000000000000000000000000000 \\ 100000000000001000000000000000000000000000 \\ 110000000000000100000000000000000000000000 \\ 111000000000000010000000000000000000000000 \\ 011100000000000001000000000000000000000000 \\ 001110000000000000100000000000000000000000 \\ 100100000000000000010000000000000000000000 \\ 110000000000000000001000000000000000000000 \\ 011000000000000000000100000000000000000000 \\ 101100000000000000000010000000000000000000 \\ 110100000000000000000001000000000000000000 \\ 111000000000000000000000100000000000000000 \\ 111100000000000000000000010000000000000000 \\ 011100000000000000000000001000000000000000 \\ 001100000000000000000000000100000000000000 \\ 000100000000000000000000000010000000000000 \\ 000000000000000000000000000001000000000000 \\ 000000000000000000000000000000100000000000 \\ 100000000000000000000000000000010000000000 \end{bmatrix}$$

$$\begin{bmatrix} 010000000000000000000000000000001000000000 \\ 001000000000000000000000000000000100000000 \\ 100100000000000000000000000000000010000000 \\ 110000000000000000000000000000000001000000 \\ 111000000000000000000000000000000000100000 \\ 011100000000000000000000000000000000010000 \\ 101100000000000000000000000000000000001000 \\ 110100000000000000000000000000000000000100 \\ 111000000000000000000000000000000000000010 \\ 111100000000000000000000000000000000000001 \\ 011100000000000000000000000000000000000000 \\ 001100000000000000000000000000000000000000 \\ 000100000000000000000000000000000000000000 \end{bmatrix}$$

$$G_{OSL58} = \begin{bmatrix} 000100000000000000000000000000000000000000 \\ 000010000000000000000000000000000000000000 \\ 000001000000000000000000000000000000000000 \\ 000000100000000000000000000000000000000000 \\ 100000010000000000000000000000000000000000 \\ 010000001000000000000000000000000000000000 \\ 101000000100000000000000000000000000000000 \\ 010100000010000000000000000000000000000000 \\ 101000000001000000000000000000000000000000 \\ 010000000000100000000000000000000000000000 \\ 001000000000010000000000000000000000000000 \\ 000000000000001000000000000000000000000000 \\ 100000000000000100000000000000000000000000 \\ 110000000000000010000000000000000000000000 \\ 111000000000000001000000000000000000000000 \\ 011000000000000000100000000000000000000000 \\ 001000000000000000010000000000000000000000 \\ 100000000000000000001000000000000000000000 \\ 110000000000000000000100000000000000000000 \\ 011000000000000000000010000000000000000000 \\ 101000000000000000000001000000000000000000 \\ 110000000000000000000000100000000000000000 \\ 111000000000000000000000010000000000000000 \\ 111100000000000000000000001000000000000000 \\ 011100000000000000000000000100000000000000 \\ 001100000000000000000000000010000000000000 \\ 000100000000000000000000000001000000000000 \\ 000000000000000000000000000000100000000000 \\ 000000000000000000000000000000010000000000 \\ 000000000000000000000000000000001000000000 \end{bmatrix}$$

$$\begin{bmatrix} 100000000000000000000000000001000000000 \\ 010000000000000000000000000000100000000 \\ 001000000000000000000000000000010000000 \\ 100000000000000000000000000000001000000 \\ 110000000000000000000000000000000100000 \\ 111000000000000000000000000000000010000 \\ 011000000000000000000000000000000001000 \\ 101000000000000000000000000000000000100 \\ 110000000000000000000000000000000000010 \\ 111000000000000000000000000000000000001 \\ 111000000000000000000000000000000000000 \\ 011000000000000000000000000000000000000 \\ 001000000000000000000000000000000000000 \end{bmatrix}$$

$$G_{OSL68} = \begin{bmatrix} 001000000000000000000000000000000000000000 \\ 000100000000000000000000000000000000000000 \\ 000010000000000000000000000000000000000000 \\ 000001000000000000000000000000000000000000 \\ 000000100000000000000000000000000000000000 \\ 100000010000000000000000000000000000000000 \\ 010000001000000000000000000000000000000000 \\ 100000000100000000000000000000000000000000 \\ 010000000010000000000000000000000000000000 \\ 100000000001000000000000000000000000000000 \\ 010000000000100000000000000000000000000000 \\ 000000000000010000000000000000000000000000 \\ 000000000000001000000000000000000000000000 \\ 100000000000000100000000000000000000000000 \\ 110000000000000010000000000000000000000000 \\ 111000000000000001000000000000000000000000 \\ 010000000000000000100000000000000000000000 \\ 000000000000000000010000000000000000000000 \\ 100000000000000000001000000000000000000000 \\ 110000000000000000000100000000000000000000 \\ 101000000000000000000010000000000000000000 \\ 100000000000000000000001000000000000000000 \\ 110000000000000000000000100000000000000000 \\ 110000000000000000000000010000000000000000 \\ 110000000000000000000000001000000000000000 \\ 110000000000000000000000000100000000000000 \\ 010000000000000000000000000010000000000000 \\ 000000000000000000000000000001000000000000 \\ 000000000000000000000000000000100000000000 \\ 000000000000000000000000000000010000000000 \end{bmatrix}$$

$$\begin{bmatrix} 000000000000000000000000000001000000000 \\ 100000000000000000000000000000100000000 \\ 010000000000000000000000000000010000000 \\ 000000000000000000000000000000001000000 \\ 100000000000000000000000000000000100000 \\ 110000000000000000000000000000000010000 \\ 110000000000000000000000000000000001000 \\ 010000000000000000000000000000000000100 \\ 100000000000000000000000000000000000010 \\ 110000000000000000000000000000000000001 \\ 110000000000000000000000000000000000000 \\ 111000000000000000000000000000000000000 \\ 010000000000000000000000000000000000000 \end{bmatrix}$$

$$G_{OSL78} = \begin{bmatrix} \text{large binary matrix} \end{bmatrix}$$

$$G_{OSL88} = \begin{bmatrix} \text{large binary matrix} \end{bmatrix}$$

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for generating multiple bits of a pseudonoise sequence by computing the bits in parallel, comprising:
   a) a state memory;
   b) a next state generator communicatively connected with said state memory, said next state generator being configured to provide next state pre-determined number of states apart from a current state by a single operation; and
   c) an output generator communicatively connected with said state memory.

2. The apparatus of claim 1 wherein said state memory has been configured to hold:
   a) a set of initial values of states; and
   b) a set of values of states generated by said next state generator or a jump generator.

3. The apparatus of claim 1 wherein said set of initial values of states comprises:
   a) coefficients of a generating polynomial.

4. The apparatus of claim 3 wherein said generating polynomial is:

$$P_I(x) = x^{15} + x^{13} + x^9 + x^8 + x^7 + x^5 + 1.$$

5. The apparatus of claim 3 wherein said generating polynomial is:

$$P_Q(x) = x^{15} + x^{12} + x^{11} + x^{10} + x^6 + x^5 + x^4 + x^3 + 1.$$

6. The apparatus of claim 3 wherein said generating polynomial is:

$$P(x) = x^{42} + x^{35} + x^{33} + x^{31} + x^{27} + x^{26} + x^{25} + x^{22} + x^{21} + x^{19} + x^{18} + x^{17} + x^{16}(1) + x^{10} + x^7 + x^6 + x^5 + x^3 + x^2 + x + 1.$$

7. The apparatus of claim 1 wherein said next state generator has been configured to:
   a) accept one set of values of states;
   b) generate another set of values of states a first pre-determined number of states apart from current state by multiplying said accepted values by a next step matrix; and c) provide said another set of values of states to said memory.

8. The apparatus of claim 7 wherein said first predetermined number of states is two and said next step matrix is:

$$G_{NSI2} = \begin{bmatrix} 1010000000000000 \\ 0101000000000000 \\ 0000100000000000 \\ 0000010000000000 \\ 1000001000000000 \\ 1100000100000000 \\ 1100000010000000 \\ 0100000001000000 \\ 1000000000100000 \\ 0100000000010000 \\ 0000000000001000 \\ 0000000000000100 \\ 0000000000000010 \\ 1000000000000000 \\ 0100000000000000 \end{bmatrix}.$$

9. The apparatus of claim 7 wherein said first predetermined number of states is two and said next step matrix is:

$$G_{NSQ2} = \begin{bmatrix} 0010000000000000 \\ 1001000000000000 \\ 1100100000000000 \\ 1100010000000000 \\ 0100001000000000 \\ 0000000100000000 \\ 0000000010000000 \\ 1000000001000000 \\ 1100000000100000 \\ 1100000000010000 \\ 1100000000001000 \\ 0100000000000100 \\ 0000000000000010 \\ 0000000000000001 \\ 1000000000000000 \\ 0100000000000000 \end{bmatrix}.$$

10. The apparatus of claim 7 wherein said first predetermined number of states is eight and said next step matrix is:

$$G_{NSI8} = \begin{bmatrix} 0100101010000000 \\ 0010010101000000 \\ 1101100000100000 \\ 1110110000010000 \\ 0111011000000100 \\ 1011101100000010 \\ 0001011100000001 \\ 0100000100000000 \\ 0110101000000000 \\ 0011010100000000 \\ 0101000000000000 \\ 1010100000000000 \\ 0101010000000000 \\ 0010101000000000 \\ 1001010100000000 \end{bmatrix}.$$

11. The apparatus of claim 7 wherein said first predetermined number of states is eight and said next step matrix is:

$$G_{NSQ8} = \begin{bmatrix} 1011110010000000 \\ 0101111001000000 \\ 1010111100100000 \\ 0110101100010000 \\ 0000100100000100 \\ 0011100000000010 \\ 1001110000000001 \\ 1100111000000000 \\ 1110011100000000 \\ 0100111100000000 \\ 0001101100000000 \\ 1011000100000000 \\ 1110010000000000 \\ 1111001000000000 \\ 0111100100000000 \end{bmatrix}.$$

12. The apparatus of claim 1 wherein said output generator has been configured to:
a) accept one set of values of states; and
b) generate multiple output bits in parallel by multiplying said accepted values by an output state matrix.

13. The apparatus of claim 12 wherein said multiple is two and said output state matrix is:

$$G_{OSI2} = \begin{bmatrix} 0100000000000000 \\ 1000000000000000 \end{bmatrix}.$$

14. The apparatus of claim 12 wherein said multiple is two and said output state matrix is:

$$G_{OSQ2} = \begin{bmatrix} 0100000000000000 \\ 1000000000000000 \end{bmatrix}.$$

15. The apparatus of claim 12 wherein said multiple is eight and said output state matrix is:

$$G_{OSI8} = \begin{bmatrix} 1001010100000000 \\ 0010101000000000 \\ 0101010000000000 \\ 1010100000000000 \\ 0101000000000000 \\ 1010000000000000 \\ 0100000000000000 \\ 1000000000000000 \end{bmatrix}.$$

16. The apparatus of claim 12 wherein said multiple is eight and said output state matrix is:

$$G_{OSQ8} = \begin{bmatrix} 0111100100000000 \\ 1111001000000000 \\ 1110010000000000 \\ 1100100000000000 \\ 1001000000000000 \\ 0010000000000000 \\ 0100000000000000 \\ 1000000000000000 \end{bmatrix}.$$

17. The apparatus of claim 1 further comprising a jump generator.

18. The apparatus of claim 17 wherein said jump generator has been configured to:
   a) accept one set of values of states;
   b) generate values of states a second pre-determined number of clocks apart from current state by multiplying said accepted values by a jump state matrix; and
   c) provide said values of states to said memory.

19. The apparatus of claim 18 wherein said second pre-determined number is sixty-four and said jump state matrix is:

$$G_{JSI64} = \begin{bmatrix} 1010110101001011 \\ 0101011010010010 \\ 000001100001100 \\ 000000110000110 \\ 000000011000011 \\ 000000001100001 \\ 101011010010101 \\ 011110111101111 \\ 000100001010010 \\ 000010000101001 \\ 101010010110001 \\ 110101001011000 \\ 011010100101100 \\ 101101010010110 \\ 010110101001011 \end{bmatrix}$$

20. The apparatus of claim 18 wherein said second pre-determined number is sixty-four and said jump state matrix is:

$$G_{JSQ64} = \begin{bmatrix} 100011001011100 \\ 010001100101110 \\ 001000110010111 \\ 000111010010111 \\ 100000100010111 \\ 110011011010111 \\ 011001101101011 \\ 101100110110101 \\ 110110011011010 \\ 011000000110001 \\ 101111001000100 \\ 110100101111110 \\ 011001011100011 \\ 001100101110001 \\ 000110010111000 \end{bmatrix}$$

21. The apparatus of claim 1 further comprising a controller.

22. The apparatus of claim 21 wherein said controller has been configured to monitor output bits of said next state generator for a pre-determined combination, and when said pre-determined combination has been reached to:
   a) overwrite an appropriate output bit value with a value of '0';
   b) void writing values of states generated by said next state generator to said state memory; and
   c) instruct said state memory to provide a set of initial values of states to said next state generator.

23. A pseudonoise (PN) sequence generator comprising:
   a) state memory for storing at least one state of a PN generator polynomial;
   b) next state generator for receiving said at least one state of said PN generator polynomial and for generating a second state of said PN generator polynomial by performing a matrix operation upon said at least one state of said PN generator polynomial; and
   c) output generator for receiving said at least one state of said PN generator polynomial and for generating at least one PN sequence output by performing a matrix operation upon said at least one state of said PN generator polynomial.

24. The apparatus of claim 23 wherein said at least one state comprises the fifteen component state of a PN short code.

25. The apparatus of claim 23 wherein said at least one state comprises the forty two component state of a PN long code.

26. The apparatus of claim 23 wherein said generator polynomial is:

$$P_I(x) = x^{15} + x^{13} + x^9 + x^8 + x^7 + x^5 + 1.$$

27. The apparatus of claim 23 wherein said generator polynomial is:

$$P_Q(x) = x^{15} + x^{12} + x^{11} + x^{10} + x^6 + x^5 + x^4 + x^3 + 1.$$

28. The apparatus of claim 23 wherein said generator polynomial is:

$$P(x) = x^{42} + x^{35} + x^{33} + x^{31} + x^{27} + x^{26} + x^{25} + x^{22} + x^{21} + x^{19} + x^{18} + x^{17} + x^{16}(1) + x^{10} + x^7 + x^6 + x^5 + x^3 + x^2 + x + 1.$$

29. The apparatus of claim 23 wherein said next state generator computes the state of PN sequence generator two clock cycles in the future and performs said matrix operation in accordance with a matrix $G_{NSI2I}$;

$$G_{NSI2} = \begin{bmatrix} 1010000000000000 \\ 0101000000000000 \\ 0000100000000000 \\ 0000010000000000 \\ 1000001000000000 \\ 1100000100000000 \\ 1100000010000000 \\ 0100000000100000 \\ 1000000000010000 \\ 0100000000001000 \\ 0000000000000100 \\ 0000000000000010 \\ 0000000000000001 \\ 1000000000000000 \\ 0100000000000000 \end{bmatrix}.$$

30. The apparatus of claim 23 wherein said next state generator performs said matrix operation in accordance with a matrix $G_{NSQ2}$:

$$G_{NSQ2} = \begin{bmatrix} 001000000000000 \\ 100100000000000 \\ 110010000000000 \\ 110001000000000 \\ 010000100000000 \\ 000000010000000 \\ 000000001000000 \\ 100000000100000 \\ 110000000010000 \\ 110000000001000 \\ 110000000000100 \\ 010000000000010 \\ 000000000000001 \\ 100000000000000 \\ 010000000000000 \end{bmatrix}.$$

31. The apparatus of claim 23 wherein said output generator computes the next two outputs of said PN sequence generator and performs said matrix operation in accordance with a matrix $G_{OSI2}$:

$$G_{OSI2} = \begin{bmatrix} 010000000000000 \\ 100000000000000 \end{bmatrix}.$$

32. The apparatus of claim 23 wherein said PN generator programmed into an ASIC.

33. The apparatus of claim 23 wherein said PN generator programmed into a field programmable gate array.

34. A method for generating multiple bits of a pseudonoise sequence by computing the bits in parallel, comprising the steps of:
   a) storing at least one set of values of states in a state memory;
   b) generating a second set of values of states by a next state generator, said second set being a first pre-determined number of states apart from said at least one set; and
   c) generating a set of output bits in parallel by an output generator, said set of output bits being derived from said at least one set of values of states.

35. The method of claim 34, wherein the step of storing at least one set of values of states comprises the steps of:
   a) holding a set of initial values of states; and
   b) holding another set of values of states from said next state generator or from a jump generator.

36. The method of claim 34, wherein the step of generating a second set of values of states comprises the step of:
   a) multiplying said at least one set of values of states by a next step matrix.

37. The method of claim 34, wherein the step of generating a set of output bits in parallel comprises the step of:
   a) multiplying said at least one set of values of states by an output state matrix.

38. The method of claim 34, further comprising the step of monitoring a set of values of states of said next state generator for a pre-determined combination.

39. The method of claim 38, wherein upon detecting said pre-determined combination, the method further comprises the steps of:
   a) overwriting an appropriate output bit value with a value of '0';
   b) voiding writing said second set of values of states generated by said next state generator to said state memory; and
   c) instructing said state memory to provide a set of initial values of states to said next state generator.

40. The method of claim 34, further comprising the step of generating a third set of values of states by a jump state generator, said third set being a second pre-determined number of states apart from said at least one set.

41. The method of claim 40, wherein the step of generating a third set of values of states by a jump state generator comprises the step of:
   a) multiplying said at least one set of values of states by a jump state matrix.

* * * * *

UNITED STATES PATENT AND TRADEMARK OFFICE
CERTIFICATE OF CORRECTION

PATENT NO.   : 6,640,236 B1
DATED        : October 28, 2003
INVENTOR(S)  : Edward D. Lupin et al.

It is certified that error appears in the above-identified patent and that said Letters Patent is hereby corrected as shown below:

<u>Title page,</u>
Item [75], Inventors, the first-named inventor should be listed as follows:
-- Edward D. Lupin --

Signed and Sealed this

Ninth Day of March, 2004

JON W. DUDAS
*Acting Director of the United States Patent and Trademark Office*